(12) United States Patent
Liu et al.

(10) Patent No.: US 7,111,094 B1
(45) Date of Patent: Sep. 19, 2006

(54) SYSTEM, METHOD AND ALGORITHM FOR THE OPTIMIZATION OF ENTROPY FOR LOSSLESS COMPRESSION

(76) Inventors: Shin-Ping Liu, 308 Bradley #53, Denton, TX (US) 76201; Dennis Tucker, 305 Bradley #53, Denton, TX (US) 76201; Michael D. Harold, 1231 Greenway Dr., Suite 380, Irving, TX (US) 75028

( * ) Notice: Subject to any disclaimer, the term of this patent is extended or adjusted under 35 U.S.C. 154(b) by 516 days.

(21) Appl. No.: 09/631,368

(22) Filed: Aug. 2, 2000

Related U.S. Application Data

(60) Provisional application No. 60/146,654, filed on Aug. 2, 1999.

(51) Int. Cl.
*H04B 1/66* (2006.01)
(52) U.S. Cl. .......................... 710/65; 710/68; 382/244; 382/246; 382/247; 382/248; 341/51
(58) Field of Classification Search ................. 710/65, 710/68; 358/1.15, 68; 701/3; 382/232, 382/244, 246, 247, 248; 341/51; 381/51
See application file for complete search history.

(56) References Cited

U.S. PATENT DOCUMENTS

| | | | | |
|---|---|---|---|---|
| 5,142,283 A | * | 8/1992 | Chevion et al. ............. | 341/107 |
| 5,594,435 A | | 1/1997 | Remillard ................... | 341/151 |
| 5,727,092 A | | 3/1998 | Sandford, II et al. ....... | 382/251 |
| 6,049,630 A | | 4/2000 | Wang et al. ................. | 382/239 |
| 6,081,211 A | * | 6/2000 | de Queiroz et al. .......... | 341/65 |
| 6,263,106 B1 | * | 7/2001 | Yamagata .................... | 382/232 |
| 6,278,913 B1 | * | 8/2001 | Jiang ............................. | 701/3 |
| 6,309,424 B1 | * | 10/2001 | Fallon ......................... | 341/51 |
| 6,337,747 B1 | * | 1/2002 | Rosenthal .................. | 358/1.15 |
| 6,658,159 B1 | * | 12/2003 | Taubman ..................... | 382/240 |
| 6,661,839 B1 | * | 12/2003 | Ishida et al. ................. | 375/240 |
| 6,741,368 B1 | * | 5/2004 | Hoel .......................... | 358/1.9 |

FOREIGN PATENT DOCUMENTS

| | | |
|---|---|---|
| DE | 196 53 133 A | 6/1998 |
| WO | WO 95 32554 A | 11/1995 |

* cited by examiner

*Primary Examiner*—A. Elamin
(74) *Attorney, Agent, or Firm*—Patton Boggs LLP

(57) ABSTRACT

A system, method and algorithm for performing statistical analysis on an input data source to determine an optimal token size resulting in an increased ratio value is described. Changes to the values of the tokens prior to compression may result in an overall compression increase even if the data source has been previously compressed. Specific techniques for modifying the tokens include varying the base size, rearrangement of the tokens, and modifications by matrix multiplication. After modification of the tokens, compression of the data using one or more lossless compression methods may be performed. The technique may be repeated by using the output of previous compression processes as input to additional entropy and compression optimization.

16 Claims, 6 Drawing Sheets

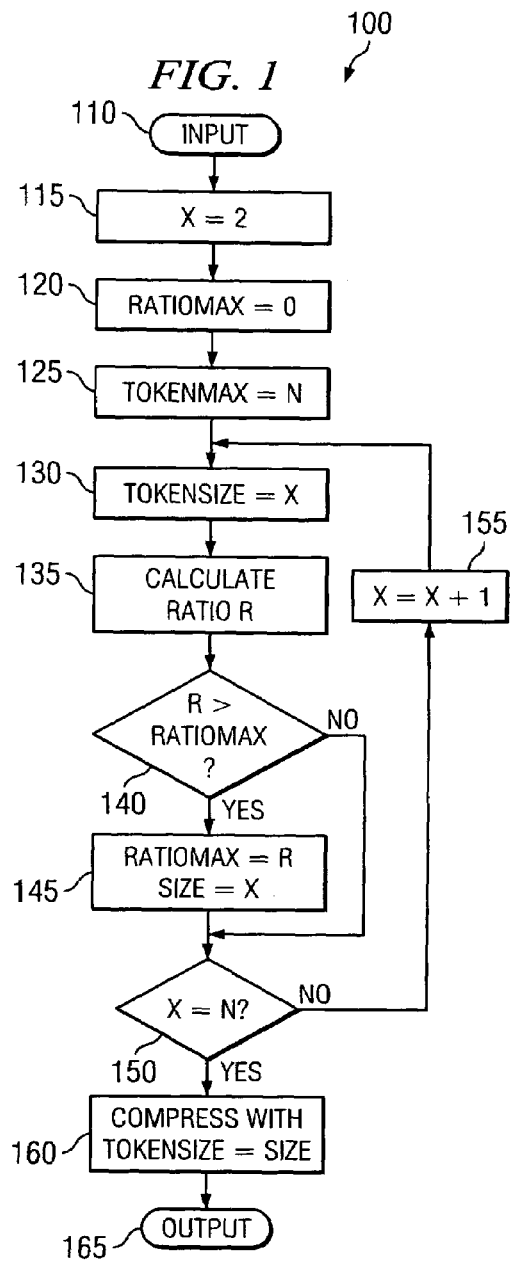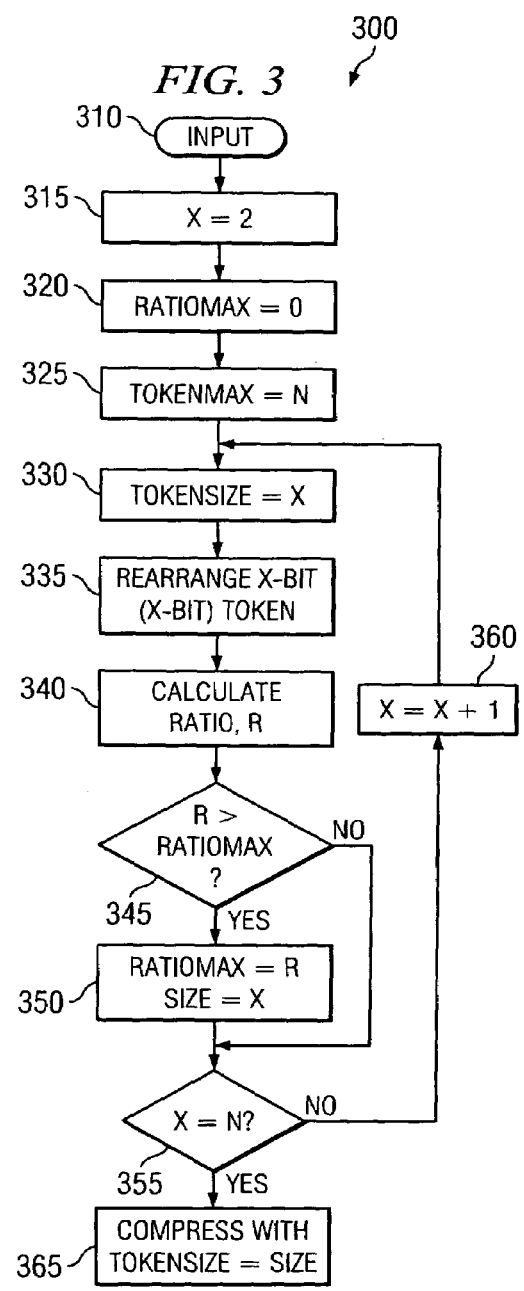

FIG. 2

```
Start
N->input(N) // N is the max token size
Array->input(Array) // Array is the input data
HR->0 // Highest ratio
BT->0 // Best Token size
TA->NULL // Token array
CA->NULL // Compressed data array
For x->2 to N do // Process all token sizes from 2 thru N
Begin
    R->0 // Temporary ratio
    TA->getTokens(Array,x) // Get an array of tokens of size x from Array
    R->getRatio(TA) // Get the ratio for this set
    if R > HR then // If current ratio is higher than the highest ratio
    Begin
        HR->R // Set highest ratio equal current ratio
        BT->x // Set best token size equal current token size
    End // if R
End // For x
TA->getTokens(Array,BT) // Get an array of tokens of size BT from Array
CA->Compress(TA,BT) // Compress the tokens of size BT
Output(CA) // Output the compressed data
Stop
```

FIG. 4

```
Start
N->input(N) // N is the max token size
Array->input(Array) // Array is the input data
AT->input(AT) // Type of bit arrangement
HR->0 // Highest ratio
BT->0 // Best Token size
TA->NULL // Token array
CA->NULL // Compressed data array
For x->2 to N do // Process all token sizes from 2 thru N
Begin
    R->0 // Temporary ratio
    TA->getTokens(Array,x) // Get an array of tokens of size x from Array
    TA->arrangeBits(TA,x,AT) // Re-arrange the bits
    R->getRatio(TA) // Get the ratio for this set
    if R > HR then // If current ratio is higher than the highest ratio
    Begin
        HR->R // Set highest ratio equal current ratio
        BT->x // Set best token size equal current token size
    End // if R
End // For x
TA->getTokens(Array,BT) // Get an array of tokens of size BT from Array
TA->arrangeBits(TA,x,AT) // Re-arrange the bits
CA->Compress(TA,BT) // Compress the tokens of size BT
Output(CA) // Output the compressed data
Stop
```

FIG. 5

```
Start
N->input(N) // N is the max token size
Array->input(Array) // Array is the input data
HR->0 // Highest ratio
BT->0 // Best Token size
BR->0 // Best rotation
TA->NULL // Token array
CA->NULL // Compressed data array
For x->2 to N do // process all token sizes from 2 thru N
Begin
    TA->getTokens(Array,x) // Get an array of tokens of size x from Array
    For y->0 to x do
    Begin
        R->0 // Temporary ratio
        TA-> getRotation(TA,y) // Rotate the bits for this set
        R-> getRatio(TA) // Get the ratio for this set
        if R > HR then // If current ratio is higher than the highest ratio
        Begin
            HR->R // Set highest ratio equal current ratio
            BT->x // Set best token size equal current token size
            BR->y // Set best rotation equal current rotation
        End // if R
    End // For y
End // For x
TA->getTokens(Array,BT) // Get an array of tokens of size BT from Array
TA->getRotation(TA,BR) // Rotate the bits for this set
CA->Compress(TA,BT) // Compress the tokens of size BT
Output(CA) // Output the compressed data
Stop
```

FIG. 9

```
Function getMatrixTransform(Array, MatrixSize, C1, TokenSize)
Begin
MS->MatrixSize
TS->TokenSize
NewArray->NULL // Array for transformed data
Matrix->getMatrix(MS,C1) // Create a square matrix of size MS with C1 as the base
If checkInverse(Matrix) = NULL // Matrix must have a unique Inverse
    Then return NULL
NewArray->getTransform(Array, Matrix, MS, TS) // Transform data by matrix
Return NewArray
End
```

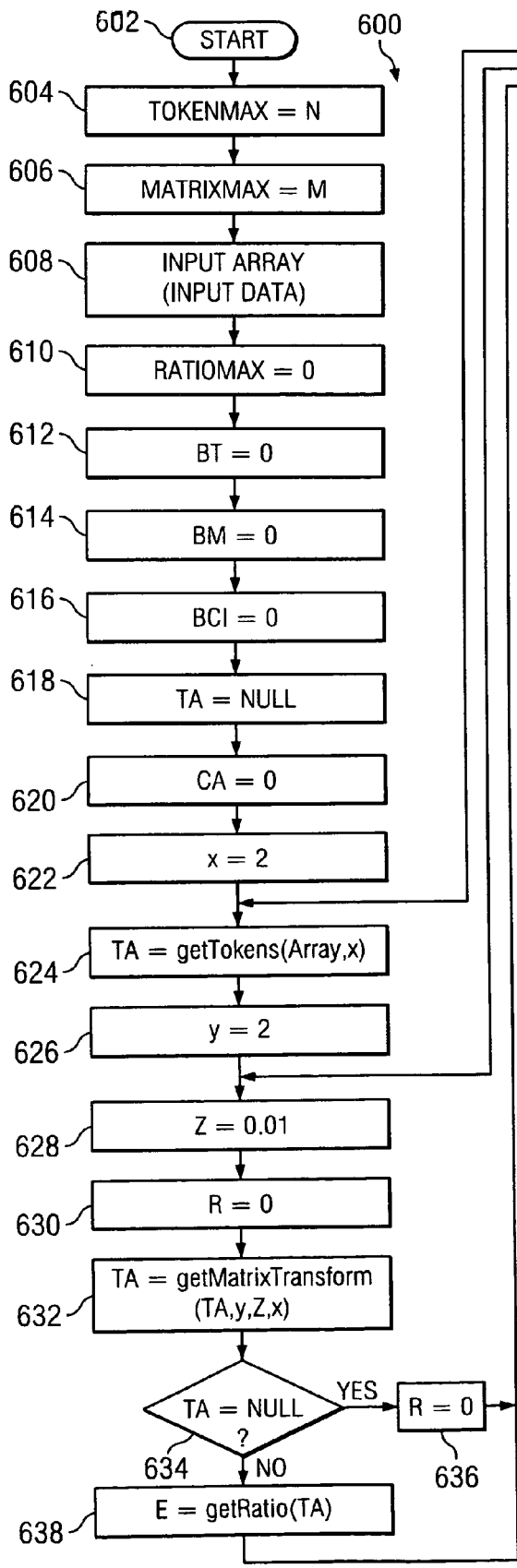
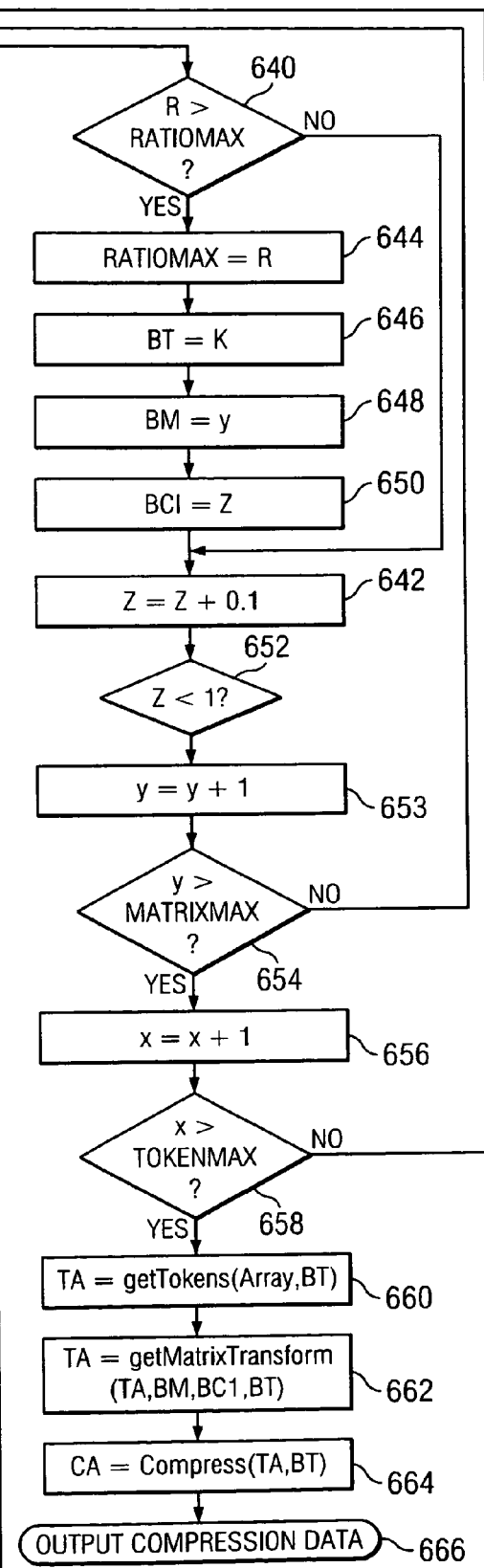
FIG. 6

FIG. 7

```
Start
N->input(N) // N is the max token size
M->input(M) // M is the max matrix size
Array->input(Array) // Array is the input data
HR->0 // Highest ratio
BT->0 // Best Token size
BM->0 // Best matrix size
BC1->0 // Best C1
TA->NULL // Token array
CA->NULL // Compressed data array
For x->2 to N do // Process all token sizes from 2 thru N
Begin
    TA->getTokens(Array,x) // Get an array of tokens of size x from Array
    For y->2 to M do
    Begin
        Z->0.01
        While Z<1.0 do
        Begin
            R->0
            TA->getMatrixTransform(TA,y,Z,x) // Transform the tokens
            If TA = NULL
                Then R->0
            Else
                R->getRatio(TA) // Get the ratio for this set
            // If current ratio is higher than the highest ratio
            if R > HR then
            Begin
                HR->R // Set highest ratio equal current ratio
                BT->x // Set best token size equal current token size
                BM->y // Set best matrix size equal current matrix size
                BC1->Z // Set best C1 equal current C1
            End // if R
            Z->Z+0.01
        End // While Z
    End // For y
End // For x
TA->getTokens(Array,BT) // Get an array of tokens of size BT from Array
TA->getMatrixTransform(TA,BM,BC1,BT) // Transform the tokens
CA->Compress(TA,BT) // Compress the tokens of size BT
Output(CA) // Output the compressed data
Stop
```

*FIG. 8*

```
Start
N->input(N) // N is the max token size
M->input(M) // M is the max matrix size
Array->input(Array) // Array is the input data
HR->0 // Highest ratio
BT->0 // Best Token size
BM->0 // Best matrix size
BC1->0 // Best C1
TA->NULL // Token array
CA->NULL // Compressed data array
For y->2 to M do
Begin
    Z->0.01
    While Z<1.0 do
    Begin
        R->0
        TA->getMatrixTransform(TA,y,Z,8) // Transform the tokens
        If TA = NULL
            Then R->0
        Else
        Begin
            For x->2 to N do // Process all token sizes from 2 thru N
            Begin
                TA->getTokens(Array,x) // Get an array of tokens of size x from Array
                R->getRatio(TA) // Get the ratio for this set
            End // For x
        End
        // If current ratio is higher than the highest ratio
        if R > HR then
        Begin
            HR->R // Set highest ratio equal current ratio
            BT->x // Set best token size equal current token size
            BM->y // Set best matrix size equal current matrix size
            BC1->Z // Set best C1 equal current C1
        End // if R
        Z->Z+0.01
    End // While Z
End // For y
TA->getMatrixTransform(TA,BM,BC1,8) // Transform the tokens
TA->getTokens(Array,BT) // Get an array of tokens of size BT from Array
CA->Compress(TA,BT) // Compress the tokens of size BT
Output(CA) // Output the compressed data
Stop
```

SYSTEM, METHOD AND ALGORITHM FOR THE OPTIMIZATION OF ENTROPY FOR LOSSLESS COMPRESSION

This application claims the benefit of Provisional Application No. 60/146,654, filed Aug. 2, 1999.

BACKGROUND OF THE INVENTION

The invention relates to data compression and, in particular, to a lossless N-bit data compression algorithm and method utilizing a pre-compression entropy optimization technique on the data source.

DESCRIPTION OF RELATED ART

For many years, data compression has been critically important in computer sciences, digital communications and other technologies. While rapid scientific advances allow for increasingly complex data applications, the increasing demand for data intensive applications and services, e.g., the rising, popularity of Internet multimedia, often severely strains or overwhelms the available capacity and delivery capabilities of existing data infrastructures. The increasing capacities of personal computer hard disks illustrate the consumer appeal to the variety of data-intense applications available. With the growing usage of visual images as the norm, the need for even greater data capacities will continue to increase.

Often, however, various fields of the computer sciences require data compression regardless of data storage capacities available. For example, in communication systems, there is a finite amount of bandwidth available for transmitting data. In data transmissions, storage capacities on a receiving or transmitting end of a network may be inconsequential if data to be transmitted is too voluminous for an available transmission medium. When considering bandwidth limitations, greater compressions result in more efficient utilization of the transmission medium. In any event, it is generally more desirable to transmit data in a compressed form rather than a noncompressed form.

Data compression indicates the reduction of the representation of information—but not necessarily the information itself. By reducing the number of necessary bits to encode information, the bandwidth required for transmitting the information, as well as the capacity of storage devices required to store the information, e.g., hard disks, tape drives, floppy disks, etc., is proportionally reduced. In general, data compression techniques fall under two broad categories: lossy and lossless.

Lossy compression refers to a compression algorithm that actually reduces the amount of information, i.e., lossy compression reduces the amount of information in the original, uncompressed data as part of the process of compressing the data. Joint Photographic Experts Group (JPEG) and Moving Pictures Experts Group (MPEG) formats are two popular forms of lossy compression. JPEG is a compression technique utilized primarily in imaging. This particular method of compression operates by converting a color image into picture elements (pixels). The pixels are dots with values representing color and brightness. The image is partitioned into blocks of pixels, e.g., 16×16, and then reduced to a smaller block, e.g., 8×8, by simply subtracting every other pixel, thus the introduction of a loss of information from the original data. Additional losses are introduced into JPEG compression and the overall technique allows compression rates of 20 to 30:1. Even greater compression rates can be achieved with JPEG compression, but these are generally perceptible by the viewer. In many lossy compression algorithms, the data to be lost in the compression is deemed 'less important' than data not subject to be lost. For example, in videoconferencing applications, audio data may be designated as more important with respect to the video portion of the videoconference. Thus, when a loss is required during the transmission of the videoconference, e.g., due to latency issues, portions of the video signal may be subjected to a lossy compression to better preserve the audio portion. Often, attempts to recover this data are made at the receiver, or decompression, stage by interpolation or other techniques.

Lossless compression refers to a compression algorithm that reduces the number of bits required to represent the original information but without reducing the information itself. In this manner, no information is lost or altered and when a compressed image, for example, that has been compressed by a lossless algorithm, is decompressed, the information originally present in the uncompressed image is perfectly recovered. The well-known Huffman encoding algorithm is an example of a lossless compression technique. In Huffman encoding, frequently occurring strings of characters are replaced with shorter codes. Variations of the Huffman encoding algorithm read the original information twice. The first read generally determines the frequency of each character within the data. The second read is performed during the implementation of the encoding process. The popular PKZIP utility, for example, utilizes Huffman encoding. Lossless compression is often required in some cases where data compressions are needed. For example, when compressing text files, lossy techniques are generally unacceptable since, for the data to provide any value upon extraction, the decompressed data must be a perfect representation of the precompressed data.

The present invention is directed to a lossless compression system and method using reiterative, N-bit compression. Since information theory describes the entropy, i.e., a measure of the disorder, of a system as the negative logarithm of the probability of its occurrence in a given symbol string, the entropy is as much a function of the model used to describe the symbol string as it is a function of the data within the symbol string itself. By taking the entropy of a source, i.e., a given information quantity, as a dependent variable along with the independent variables of base size, the number of unique symbols and the total number of symbols, it is possible to optimize the compressibility of an input source by modeling the relations of the independent variables. Accordingly, the present invention improves on the prior art compression techniques by optimizing the entropy of a data source prior to, or as part of, a subsequent compression.

SUMMARY OF THE INVENTION

A method and algorithm for performing statistical analysis on an input data source to determine an optimal token size resulting in a change in entropy are described. Changes to the values of the tokens prior to compression may result in an overall compression increases even if the data source has been previously compressed. Specific techniques for modifying the tokens include varying the base size, rearrangement of the tokens, and modifications by matrix multiplication. After modification of the tokens, compression of the data using one or more lossless compression methods may be performed. The technique may be repeated by using the output of previous compression processes as input to additional entropy and compression optimization procedures.

BRIEF DESCRIPTION OF THE FIGURES

A more complete understanding of the method and apparatus of the present invention may be obtained by reference to the following Detailed Description when taken in conjunction with the accompanying Drawings wherein:

FIG. 1 is a flowchart illustrating the methodology of entropy optimization obtained by modification of the token, or base, size;

FIG. 2 is a representative pseudocode for implementing the flowchart illustrated in FIG. 1;

FIG. 3 is a flowchart illustrating the methodology of entropy optimization obtained by token bit rearrangement performed in conjunction with modification of the token size;

FIG. 4 is a representative pseudocode for implementing the flowchart illustrated in FIG. 3, particularly, by changing the base size and rearranging the bits;

FIG. 5 is a representative pseudocode for implementing the flowchart illustrated in FIG. 3, particularly, by changing the base size and rotating the bits;

FIG. 6 is a flow chart illustrating the methodology of entropy optimization obtained by matrix multiplication on a varied token size input source;

FIG. 7 is a representative pseudocode for implementing the flowchart illustrated in FIG. 6, particularly, by changing the base size and matrix multiplication;

FIG. 8 is a representative pseudocode for implementing the flowchart illustrated in FIG. 6, presenting an alternative methodology to FIG. 7; and FIG. 9 is a representative pseudocode for a getMatrixTransform function used in conjunction with the inventions described in FIGS. 7 and 8.

DETAILED DESCRIPTION OF PREFERRED EXEMPLARY EMBODIMENTS OF THE PRESENT INVENTION

The following description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as examples. Various modifications to the preferred embodiments will be readily apparent to one skilled in the art, and the general principles defined herein may be applied to other embodiments and applications without departing from the spirit and scope of the invention. The present invention is not intended to be limited to the embodiments shown, but is to be accorded the widest possible scope consistent with the principles and features disclosed herein.

Before discussing preferred embodiments of the present invention, the following definitions should be understood:

File_size: The number of bytes in a data file.

Token_count: The number of tokens in the data file. This number is (File_size*8)/Token_size.

Unique_tokens: The number of unique tokens in the file. The token range is 0 to $2^{Token\_size}$, so there are $2^{Token\_size}$ possibilities. A large token_count and small unique_tokens count will give high compression.

Unique_token_percentage or Utoken_percentage: (token_count−unique_tokens)/token_count Frequency_mean: The frequency is the number of times each token appears in the file. This Frequency_mean variable is the mean of the frequencies for the file.

Frequency_max: The largest frequency count for the file.

Frequency_min: The smallest frequency count>0 for the file.

Frequency_standard_deviation: The standard deviation for the frequencies.

Entropy: A calculation of probabilities.

Predicted_compression_ratio or ratio (R): This calculation can be generalized into ((token_bits−entropy_bits)/token_bits)*100.

Token_value_mean: Token value is the face value of the token. Accordingly, there are N possibilities, so token_value is a number in the range of 0 to N. Token_value_mean is the mean of those values. If the mean is halfway between 0 and N, the token values were evenly distributed across the range. Low or high mean values signify tokens that are grouped and this can affect compression.

Token_value_standard_deviation: The standard deviation for the

Token_value_max: The largest token value found in the file. The range of this value is 0 to N.

Token_value_min: The smallest token value found in the data file.

Compressed_size: The compressed data file size in bytes.

Compression_ratio: ((file_size−compressed_size)/file_size)*100.

As is well understood in information theory, entropy provides a measure of disorder of a system and is related to the amount of information contained within the system. A highly ordered system (low entropy) can generally be described using fewer bits of information than a disordered system (high entropy). For example, a string of symbols consisting of a million 1's can be effectively described using run-length encoding as (1, 1000000), i.e., the symbol "1" repeated 1,000,000 times. On the other hand, a string of a million random symbols is much more difficult, and often impossible, to compress in a similar manner.

Information theory describes the entropy (H(p)), also denoted hereinbelow as part of the calculation of E, of a symbol as the negative logarithm of the probability of its occurrence in a given symbol string, according to the formula:

$$H(p) = -\sum_i p_i \log p_i$$

where p is a probability distribution. Taking the base size, the number of unique symbols and the total number of symbols as independent variables, the present invention advantageously utilizes the entropy as a part of the dependent variable, something not contemplated by prior compression techniques. Accordingly, it is possible to optimize the compressibility of any input source by modeling the relations of the independent variables. As described more fully hereinbelow, this is possible even if the information has already been compressed.

As is understood in the art, the base size of the binary symbol set being used by the compressor, i.e., the compression algorithm, is dependent upon the data types available in the programming language used to code the compressor. The data types in the programming language are, in turn, dependent upon the size of the underlying registers in the microprocessor, which are currently generally 32 to 64 bits in length.

The token sizes range from values of 2 to N and are affected by both the base size and the total number of symbols provided by the input source. As a rule, the number of unique symbols decreases with the base size in a random file. Furthermore, the number of unique symbols are generally inversely proportional to the total number of symbols in a random file, i.e., the number of unique symbols increases and decreases with a respective decrease and increase in the total number of symbols. Also, as the total number of symbols increases, the frequency distribution of the symbols generally becomes more linear and results in a corresponding reduction in available compression.

The total number of symbols can be modified in an input source by dividing the input source into multiple blocks. Doing so will affect both the optimal values of base size and the resulting number of unique symbols at the input source.

The base size of the binary symbol set may be modified to optimize the compressibility of any source of binary input. This is true even if the binary input has been subjected to previous compressions, i.e., if the input source is the output of a previous compression process. Thus, the theoretical limit of the number of times a symbol string may be repeatedly compressed remains undetermined.

The entropy of a data set may be changed by various methods. The calculation of entropy for a data set involves calculating the individual probabilities of each token of the data set. Varying the token size results in modifications to the number of total tokens and the number of unique tokens. These modifications result in corresponding changes in frequency and entropy. Rearranging bits to cause variations in the tokens results in changes in the number of unique tokens and the frequency of the resulting tokens, thereby resulting in changes in the entropy. In the present invention, three general methods for changing entropy are described to facilitate an increase in the compression ratio: changing the token size, rotating or rearranging the bits and transforming the bits through matrix multiplication.

N-bit compression is based on a change in conventional treatment of binary data. In N-bit compression, the bit, rather than the byte, provides the basis for the computing system and method. For an ordered set (S), i.e., class, of symbols, there exists a class $\Omega$ of N length symbol strings similar to the set of natural numbers, i.e., $\{1, 2, 3, \ldots\}$. $\Omega$ is further defined as the class of all ordered combinations of N length symbol strings where:

$N=\{1, 2, 3, \ldots\}$.

For example, where $S=\{0, 1, 2, \ldots\}$ $\Omega=\{0, 1, 2, 00, 01, 02, 10, 11, 12, 20, 21, 22, 000, \ldots\}$ Alternatively, S may represent the set, or subset, of alphabetic characters, e.g.:

$S=\{a, b, c\}$. A corresponding $\Omega$ would then be given by:

$\Omega=\{a, b, c, aa, ab, ac, ba, bb, bc, ca, cb, cc, aaa, \ldots\}$

For a binary ordered set, the class $\Omega$ of N-bits is given by:

$\Omega=\{0\ 1, 00, 01, 11, 000, \ldots\}$.

Thus, for a 4-bit, binary class $\Omega$ is defined as:

$\Omega=\{0, 1, 00, 01, 10, 11, 000, 001, 010, 011, 100, 101, 110, 111, 0000, 0001, 0010, 0011, 0100, 0101, 0110, 0111, 1000, 1001, 1010, 1011, 1100, 1101, 1110, 1111\}$.

The binary representation of members of the class $\Omega$ of N-bits does not require that any member be interpreted as a numerical value. A member of the class $\Omega$ may be identified with a member of any type of class. As a result, the class $\Omega$ is capable of defining any number of types as subclasses. When interpreted as a class having members comprised of the set of natural numbers, the class $\Omega$ is shown to contain an infinite number of each member of the class of natural numbers. For example, the binary number 1 is represented by the subclass $\{1, 01, 001, \ldots\}$. Similarly, the binary representation of the number 2 is represented by the subclass $\{10, 010, 0010, 00010, \ldots\}$.

The class of bytes is defined as a subclass of the class $\Omega$ as follows:

$\{00000000, 00000001, 00000010, \ldots, 11111111\}$.

By definition, the class $\Omega$ of N-bits is the parent class of all classes having members that may be represented as binary symbol strings. A member of $\Omega$, e.g., 10010101010, does not represent a specific object or numerical value. Rather, the member is nothing more that a binary symbol string—an abstract virtual symbol in the rawest interpretation of the member. A numerical value can then be realized from the binary symbol string by relating the numerical value, or idea, to the binary symbol string.

By specifying the $\Omega$ member lengths in bits and the binary values thereof as a subclass, it is possible to define classes of any type commonly used in computing. Subclasses of the class $\Omega$ include the natural and real number systems, microprocessor instruction sets, virtual machine instruction sets and objects of any type (including state models, state machines, texts, images, sounds, etc.). Simply stated, the class $\Omega$ of N-bits provides a means whereby all classes, attributes and relations representable in binary or digital form may be defined as members of $\Omega$ or its subclasses.

As aforementioned, the term entropy as it is used in information theory is a measure of how much information is contained or encoded in a message. A message, in turn, is defined as a string of symbols. The higher the entropy of a message, the greater is its information content. Data compression is to information theory what set theory is to higher mathematics, and as such becomes the technique by which we understand the fundamental nature of information. The lower the entropy value of a message, the smaller the message information content. Conventional information theory states that there is a limit to the degree to which data can be compressed based upon its entropy. This assertion, however, is based on the assumption that the content or meaning of the data is somehow contained within the digital representation of the data. However, by the teachings of the present invention, it is shown that this is not necessarily true. A string of bits has little or no meaning in and of itself. Very little of the meaning of any data is contained within its binary representation. The large majority of its meaning is extrinsic. By transferring more and more meaning or content to the external source or model that represents the data, greater and greater lossless compression is possible.

The class $\Omega$ of N-bits provides a mechanism whereby the entropy of a given data set may be increased or decreased at will regardless of the original content of the message. The entropy of a symbol string, i.e., message, is defined as the sum of the entropy for all the symbols in the string. The formula for determining the entropy of a given symbol in a binary message is:

$H=-\text{Log}_2(CS/TS)$, where

H=entropy;

CS=common symbols in the message; and

TS=total symbols in the message.

For example, the binary value 01000010 is a standard representation of the letter "B" using the American Standard Code for Information Interchange (ASCII). However, the binary value 01000010 in and of itself is essentially meaningless. The meaning, i.e., 'B', of this particular binary value exists only because it was decided years ago to represent the English alphabet using eight bits and 01000010 was designated the letter 'B'. By changing the length of bits of the input pursuant to the teachings of the instant invention and using the above formula for H, however, the entropy for the letter 'B' can be varied, as better illustrated in Table 1 below.

TABLE 1

| Symbol   | Probability | Entropy |
|----------|-------------|---------|
| 01000010 | 1/1         | 0       |
|          |             | Total = 0 |
| 0100     | 1/2         | 1       |
| 0010     | 1/2         | 1       |
|          |             | Total = 2 |
| 01       | 1/4         | 2       |
| 00       | 2/4         | 1       |
| 10       | 1/4         | 2       |
|          |             | Total = 5 |

In a first embodiment of the present invention, the entropy of a given data set is modified by changing the length of bits of the input symbols applied to the model, as illustrated in the above example. This effectively changes the model for each token size. Thus, the model can be varied until a desired entropy is obtained. Changing the model to find the desired entropy allows data that was previously 'uncompressible' to be compressed even further. Data compressed at some token size will reach an entropy limit and converge at the calculated probabilities for that particular data set. To change the entropy limit and the calculated probabilities, the token size can be varied.

With reference to FIG. 1, there is illustrated a flowchart, generally designated by the reference numeral 100, for implementing entropy optimization by modification of the length of bits of the input symbols, i.e., the input token or base size, applied to the model. In step 110, the input is received for ratio analysis. In step 115, a counter variable x is set to an initial value of 2, indicating the smallest possible value of the length of bits to be considered. In step 120, a variable (RATIOMAX) is initialized to zero. This variable is utilized for tracking the maximum ratio obtained. In step 125, a maximum token size (TOKENMAX) value is initialized to N, thereby limiting the bit length of the token size to be considered. In step 130, the token size variable (TOKENSIZE) is set to the current x value for ratio calculation. In step 135, the ratio R is calculated for the input symbols with token sizes of x, as defined in step 130.

A decision block is next entered at step 140. In the event that the calculated ratio R is larger than the RATIOMAX value, the RATIOMAX variable is set to the calculated R value at step 145, thereby properly identifying the current maximum ratio achieved. Also in step 145, a variable (SIZE) is set to x (such that with a k-bit token k=x) to properly identify the token size providing the greatest ratio. If, however, the calculated ratio R is less than RATIOMAX, the model proceeds to step 150. In either event, at decision block 150, the counter variable x is compared with the maximum token size N. If does not equal N, i.e., x is less than N, the model proceeds to step 155 where x is incremented and the process iteratively loops through the aforedescribed procedure beginning at step 130. If x, however, is equivalent to N indicating that all token sizes have been tested, the model branches to step 160, whereupon the data input at step 110 may be compressed with a token size of SIZE (as obtained in step 145) with maximum ratio and, consequently, maximum compression. The compressed data is then outputted (step 165). Exemplary pseudocode for implementing entropy optimization according to this fast embodiment of the present invention is set forth in FIG. 2 of the Drawings.

In a second embodiment of the present invention, entropy optimization may be obtained by rearranging the bits in the data set. One specific technique for rearranging the bits for a possible advantageous impact on the entropy is had by rotating the bits. Numerous modes of bit rotation are possible and include: shifting bits from the beginning of the data and appending the shifted bits to the end thereof; rotating bits within tokens, or manipulating the bits through any number of alternative techniques.

A grammar may be defined to describe data transformations that may be used to manipulate bit values within or between tokens. For example, an N-bit class may be defined as a collection of rules or methods having the following notation:

$\Sigma$: Z

F:

$Z_1 \rightarrow a+b$ $Z_1 \rightarrow a+Z_2+b$ where $\Sigma$ represents a finite set of binary symbol strings; and F represents a finite set of symbol substitution rules of the form $Z_1 \rightarrow a+b$ interpreted as "for any binary symbol string $Z_1$ that is an element of Z, rewrite binary symbol string $Z_1$ as binary symbol strings (a+b)" where a and b represent adjacent substrings of $Z_1$ inclusive.

The operator "+" is defined as concatenation. $Z_2$ is defined as any element of Z.

Insert $\Sigma$: Z

F:

$Z_1 \rightarrow a+b$ $Z_1 \rightarrow a+Z_2+b$

Delete $\Sigma$: Z

F:

$Z_1 \rightarrow a+b$ $Z_1 \rightarrow a$

Substitute $\Sigma$: Z

F:

$Z_1 \rightarrow a+b$ $Z_1 \rightarrow a$ $Z_1 \rightarrow a+Z_2+b$

Append $\Sigma$: Z

F:

$Z_1 \rightarrow Z_1+Z_2$

The primitive methods may be used in combination to describe more complex translation rules:

Swap $\Sigma$: Z

F:

$Z_1 \rightarrow a+b$ $Z_1 \rightarrow b+a$

Rotate

Σ: Z

F:

$Z_1 \rightarrow a+b+c$ $Z_1 \rightarrow c+a+b$

Interleave

Σ: Z

F:

$Z_1 \rightarrow a+b$ $Z_2 \rightarrow d+e$ $Z_3 \rightarrow a+d+b+e$

With reference now to FIG. 3, there is illustrated a flowchart, generally designated by the reference numeral 300, for implementing entropy optimization by rearrangement of the bits of the input symbols, i.e., the input token or base size, applied to the model. In this particular example, rearrangement of the input symbols is performed in conjunction with modification of the length of bits of the input symbols as described with reference to FIGS. 1 and 2. In step 310, the input is received for ratio analysis. In step 315, a counter variable x is set to a value of 2, thereby setting the smallest possible value of the length of bits of a token to be considered. In step 320, a variable (RATIOMAX) for tracking the maximum ratio obtained is initialized to zero. In step 325, a maximum token size (TOKENMAX) value is initialized to N, thereby limiting the maximum bit length of the tokens to be considered. In step 330, the token size variable (TOKENSIZE) is set to the current x value for ratio calculation. In step 335, the bits of the k-bit token are rearranged according to any one of the exemplary rearrangement techniques described hereinabove. e.g., swap, rotate and interleave. Once the tokens are so rearranged, a ratio value is calculated at step 340.

A decision block is next entered at step 345. In the event that the calculated ratio R is larger than the RATIOMAX value, the RATIOMAX variable is set to the calculated E value at step 350, thereby properly identifying the current maximum ratio achieved. Also in step 350, a variable (SIZE) is set to x to properly identify the token size providing the greatest ratio obtained with the rearrangement performed in step 335. If, however, the calculated ratio R is less than RATIOMAX, the model proceeds to step 355. In either event, at decision block 355, the counter variable x is compared with the maximum token size N. If x does not equal N, i.e., x is less than N, the model proceeds to step 360 where x is incremented and the procedure loops through beginning at step 330. If x, however, is equivalent to N, indicating that all token sizes have been tested for the selected rearrangement procedure, the model branches to step 36 whereupon the data input at step 310 may be compressed with a token size of SIZE (as obtained in step 350) with maximum ratio and, consequently, maximum compression. Pseudocode for implementing entropy optimization according to this technique of modification of the token size and rearrangement of the token bits is set forth in FIG. 4. Pseudocode for entropy optimization utilizing modification of the token size and a rotation rearrangement of the token bits is set forth in FIG. 5.

Results obtained for the technique of entropy optimization as described with reference to FIGS. 1 and 3 are shown below in Table 2. These results were obtained by an input file previously compressed with the well-known PKZIP utility. The original file totaled 13,573 bytes (108,584 bits) and had 8-bit tokens. Various token sizes, e.g., 9, 14, 16 and 24, were used for the entropy optimization, as described herein. For each case of token size modification, a procedure was executed implementing rearrangements (rotation) as described with reference to FIG. 3 and without rearrangements (rotation=0), according to the techniques described hereinabove with reference to FIG. 1. Utilizing 9 bit tokens, an additional compression of over 14 percent was obtained with and without token rearrangement. Corresponding increases were obtained for each procedure executing 14, 16 and 24-bit tokens, as detailed in Table 2.

TABLE 2

| Token size (bits) | 9 | 9 | 14 | 14 | 16 | 16 | 24 | 24 |
|---|---|---|---|---|---|---|---|---|
| Base size | 511 | 511 | 16383 | 16383 | 65535 | 65535 | 16777216 | 16777216 |
| Rotation | 0 | 1 | 0 | 3 | 0 | 10 | 0 | 15 |
| Total Tokens | 12064 | 12064 | 7756 | 7756 | 6786 | 6786 | 4524 | 4524 |
| Unique tokens | 482 | 477 | 1987 | 1998 | 1370 | 1420 | 1931 | 1979 |
| Utoken percentage | 4.00% | 3.95% | 25.61% | 25.76% | 20.18% | 20.92% | 42.68% | 43.74% |
| Frequency mean | 25.03 | 25.29 | 3.90 | 3.88 | 4.95 | 4.78 | 2.34 | 2.29 |
| Frequency max | 1496 | 1494 | 453 | 438 | 375 | 337 | 156 | 133 |
| Frequency min | 1 | 1 | 1 | 1 | 1 | 1 | 1 | 1 |
| Frequency Standard dev | 72.44 | 72.63 | 11.99 | 11.65 | 15.35 | 13.83 | 5.14 | 4.74 |
| Entropy | 7.72 | 7.72 | 9.72 | 9.73 | 8.79 | 8.97 | 9.94 | 10.02 |
| Compression Ratio | 14.17% | 14.18% | 30.60% | 30.53% | 45.06% | 43.92% | 58.59% | 58.25% |
| Compressed data (bytes) | 11648.78 | 11647.97 | 9419.22 | 9429.63 | 7456.56 | 7611.41 | 5619.60 | 5666.70 |

In a third embodiment of the present invention, entropy modification is obtained by transforming the bits, for example, through matrix multiplication. In this manner, the bits in a data set are transformed by mathematical calculations to change the entropy. The mathematical proof of these statements is quite simple. An exemplary entropy optimization calculation using matrix multiplication is provided below.

$$\begin{vmatrix} X \\ Y \\ Z \end{vmatrix} * \begin{vmatrix} C2 & C1 & C3 \\ C4 & C4 & C1 \\ C1 & C4 & C4 \end{vmatrix} = \begin{vmatrix} A \\ B \\ C \end{vmatrix}$$

Where

X, Y, Z are input tokens;

C1, C2, C3, C4 are selected from ststatistics information; and

A, B, C are the output tokens.

C1 through C4 would be selected in such a way as to decrease the Utoken, i.e., unique tokens, percentage in the data set. The data would be then be recovered, i.e., extracted, by using the inverse matrix applied to the output tokens. The properties of the matrix are as follows.

$$Sum \begin{vmatrix} C2, & C1, & C3 \\ C4, & C4, & C1 \\ C1, & C4, & C4 \end{vmatrix} = 1$$
$$Sum = 0$$
$$Sum = 0$$

The inverse matrix properties apply as well. The inverse of a square matrix A, denoted by $A^{-1}$, has the identity property defined by:

$$AA^{-1}=A^{-1}A=I$$

where I represents the Identity matrix.

A matrix for which an inverse exists is nonsingular. Conversely, a matrix for which an inverse does not exist is singular. The Identity matrix performs for matrix arithmetic what the number *1* performs for the arithmetic of numbers. Below is an exemplary identity matrix, although the Identity matrix is not limited to that shown.

$$I = \begin{vmatrix} 1 & 0 & 0 \\ 0 & 1 & 0 \\ 0 & 0 & 1 \end{vmatrix}$$

Choosing the appropriate values for C1 through C4 is critical. Since accuracy is essential, these numbers may not be applied directly to the input tokens. Instead, lookup tables containing integers may be used in their place in some cases. As a starting point, C1 through C4 may be initialized as follows:

C1=0.0050
C2=0.3850
C3=0.6100
C4=-0.0025

Like the bit rearrangement entropy optimization technique described hereinabove, matrix multiplication for entropy modification is preferably implemented in conjunction with base, or token, size modification.

In FIG. 6, there is illustrated a flowchart, generally designated by the reference numeral 600, for implementing entropy optimization by matrix multiplication, as described above. The process is initiated at step 602 which follows with initialization steps 604 and 606, respectively initializing the maximum token (TOKENMAX) size to N and the maximum matrix size (MATRIXMAX) to M. Following these initializations, the procedure receives at step 608 the input array (ARRAY) containing the data on which the entropy optimization is to be applied for subsequent compression thereof. In step 610, the RATIOMAX variable is initialized to zero followed by initializations of the best token (BT) variable (step 612), the best matrix (BM) variable (step 614), and the best C1 (BC1) variable (step 616). In step 640, the token array (TA) is filled with zeros at step 618 by initializing it to NULL. Next, the compressed data array (CA) is likewise initialized to NULL (step 620). In step 622, the token size variable x is initialized to 2, thereby defining the smallest possible token size on which entropy optimization can be performed.

The token array is then filled with tokens by invoking a GetToken(ARRAY, x) command which retrieves an array of tokens of size x from the input, i.e., ARRAY (step 624). Next, a matrix size variable is initialized to 2 for later limiting the matrix size on which the procedure will operate (step 626). A variable Z is next initialized at step 628 to 0.01, for example, that is later used for limiting the value of the C1 variable discussed hereinabove. As is understood in the art, the remaining values for C2 to C4 are derivable from the C1 value.

The ratio variable R is then initialized to zero in step 630. In step 632, the token array TA is loaded by invoking a getMatrixTransform(TA,y,Z,x) command to transform the tokens according to the matrix procedure described hereinabove. Following the transformation of the token array, a check is performed to determine whether it is filled with zeros, i.e. equivalent to a null array, at step 634. In the event that the TA is equivalent to a null array, the ratio is set to zero at step 636. Otherwise, the ratio is obtained by invoking a GetRatio(TA) command for calculating the ratio of the TA (step 638). The ratio is then compared to the maximum ratio (RATIOMAX) in step 640.

If the ratio is less than RATIOMAX, the procedure branches to step 642, otherwise the RATIOMAX value is set to R to reflect the new ratio value (step 644). This is followed by setting the best token size (BT), the best matrix size (BM) and the best C1 value (BC1) in respective steps 646, 648 and 650. These values are set each time a maximum ratio is obtained so that when the entire procedure is complete, compression can be performed according to the optimum matrix multiplication values so that the ratio, and thus compression, is maximized.

At step 642, the C1 value (Z) is incremented and checked to determine whether it exceeds the set threshold, e.g., 1 in step 652. If Z does not exceed the threshold, the procedure loops back and continues at step 630. If, however, Z has exceeded the set threshold, the matrix size variable y is incremented in step 652 and then compared to the maximum matrix threshold size (MATRIXMAX) at step 654. If the matrix size variable is less than MATRIXMAX, the procedure loops back to step 628 where the Z value is reset and the procedure continues as described. Once the matrix size variable exceeds MATRIXMAX, the algorithm proceeds to increment the token size variable x at step 656 which is subsequently compared to the token size threshold TOKENMAX at step 658.

If the token size has yet to reach the maximum value, the procedure loops back to step 624 where the token array is reloaded with input tokens of the new token size. If however, the maximum token size has been reached, the procedure loads the token array with tokens of size BT (step 660), i.e., the token size utilized when the maximum ratio was obtained. The token array is then transformed by the matrix procedure described hereinabove to obtain the maximum ratio calculated during the procedure (step 662). Finally, the token array is compressed in step 664 and the procedure completes by providing appropriate output in step 666. Pseudocode describing the procedure depicted in FIG. 7 is set forth in FIG. 7.

Numerous alternatives to the matrix transformation described can be implemented as those skilled in the art will recognize. Pseudocode of one exemplary alternative in which the matrix transformation is performed prior to altering the base size is set forth in FIG. 8.

The function getMatrix( ) creates a square matrix of the current size using the current value of C1 as the base. An exemplary 3×3 matrix with 0.01 as the base is provided below with properties as described hereinabove.

$$\text{MATRIX:} \begin{vmatrix} 0.495 & 0.010 & 0.495 \\ -0.005 & -0.005 & 0.010 \\ 0.010 & -0.005 & -0.005 \end{vmatrix}$$

The function getMatrixTransform performs matrix multiplication on MATRIX and ARRAY to produce NewArray. The result of the matrix multiplication of integers created from tokens and floating point numbers from MATRIX produces floating-point numbers. The floating-point numbers require more space for storage than the original integers in some cases. Therefore, the floating point numbers are dismantled, the corresponding elements resized to fit the current limits, and then packed into the smallest possible form and returned in NewArray. Pseudocode for implementing the getMatrixTransform function is set forth in FIG. 9.

As described, the above methods use the same general ideas to achieve compression. By changing the ratio of unique tokens to total tokens, the frequency of the tokens, and the number of total tokens, the entropy for a given data set may be advantageously modified. The particular method used for a given data set depends on the data itself. The statistics generated from a particular data set may be used to determine the specific method of entropy optimization and token size. Other considerations, such as performance, may also influence the final choice.

In summary, since the entropy of a symbol is defined as the negative logarithm of the probability of its occurrence in a given symbol string, the base size of the binary-symbol set, number of unique symbols, and total number of symbols in the symbol string may be modified to optimize the compressibility of any source of binary input regardless of whether that source of input is also the output of a previous compression process.

It should be understood that the system and methodology of the present invention should not be limited to the specific embodiments illustrated herein but instead by the scope of the claims set forth hereinbelow.

What is claimed is:

1. A method for lossless compression of input data, said method comprising the steps of:
   receiving said input data, said input data having a first entropy ratio associated therewith and being ordered pursuant to a first format;
   transforming said input data into a plurality of blocks pursuant to a second format;
   calculating a second entropy ratio associated with said transformed input data;
   comparing said second entropy ratio associated with said transformed input data to a reference entropy ratio;
   if said reference entropy ratio is less than said second entropy ratio, said reference entropy ratio is set equal to said second entropy ratio; and
   compressing said transformed input data in response to the second entropy ratio.

2. The method according to claim 1, wherein said step of transforming divides said input data into said plurality of blocks, each of said blocks having a given size.

3. The method according to claim 1, wherein said step of transforming rearranges a plurality of data within said input data, said second entropy ratio being calculated from said rearranged input data.

4. The method according to claim 3, wherein said plurality of data are rotated.

5. The method according to claim 3, wherein said step of transforming modifies said input data via matrix multiplication.

6. The method of claim 1, further comprising the steps of:
   repeating said steps of comparing and transforming for a plurality of additional formats, and selecting one of the plurality of additional formats with the greatest entropy ratio.

7. A system for compressing input data, said system comprising:
   an input device operable to receive said input data, said input data being ordered pursuant to a first format; and
   a processor operable to divide the input data into a first plurality of tokens and modify the format of the input data included within each of the tokens included in the first plurality of tokens, said processor further operable to determine a first entropy ratio associated with the first plurality of tokens, said processor further operable to divide the input data into a second plurality of tokens and modify the format of the input data included within each of tokens included in the second plurality of tokens, said processor further operable to determine a second entropy ratio associated with the second plurality of tokens, said processor further operable to compress the second plurality of tokens in response to comparing the second entropy ratio to the first entropy ratio.

8. The system of claim 7, wherein said input device is a communications interface.

9. The system of claim 7, wherein said input device is a memory.

10. The system of claim 7, and further comprising memory in communication with said processor, said memory operable to store the transformed input data.

11. An article of manufacture comprising a computer usable medium having computer readable program code means embodied therein for compressing input data, the computer readable program code means in said article of manufacture comprising:
   computer readable program means for receiving said input data, said input data having a first entropy ratio associated therewith and being ordered pursuant to a first format;
   computer readable program means for transforming said input data into a plurality of blocks pursuant to a second format;
   computer readable program means for calculating a second entropy ratio associated with said transformed input data;
   computer readable program means for comparing said second entropy ratio to a reference entropy ratio;
   computer readable program means for setting said reference entropy ratio equal to said second entropy ratio if said second entropy ratio exceeds said reference entropy ratio; and
   computer readable program means for compressing the transformed input data.

12. A method for compressing input data, said method comprising:
   receiving said input data, said input data having a first entropy ratio and having a first format;
   changing said format of said input data from said first format to said second format;
   calculating a second entropy ratio associated with said second format of said input data;
   comparing said second entropy ratio to a reference entropy ratio;

setting said reference entropy ratio equal to said second entropy ratio if said second entropy ratio exceeds said reference entropy ratio; and compressing said second format of input data using said second entropy ratio.

13. The method of claim 12, wherein changing said format of said input data includes subdividing an initial block of said input data into a plurality of smaller blocks, each of said smaller blocks having less data than said initial block.

14. The method of claim 12, wherein changing said format of said input data includes rearranging an order of data within said input data.

15. The method of claim 12, wherein changing said format of said input data includes rotating said input data.

16. The method according to claim 12, wherein changing said format of said input data includes modifying said input data via matrix multiplication.

* * * * *